Nov. 16, 1943.  W. I. JONES  2,334,676
ROTARY OPERATIVE FASTENER
Original Filed Nov. 10, 1938
Fig. 1.
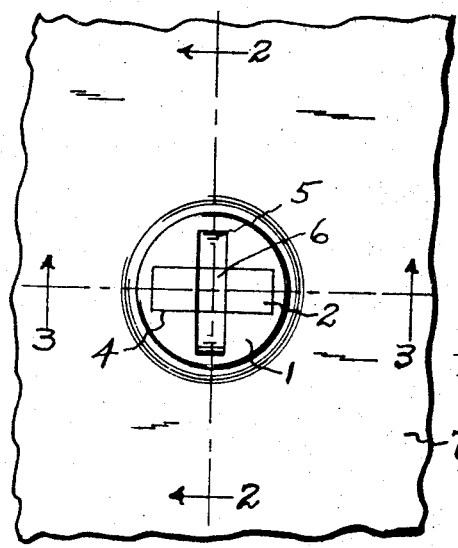
Fig. 2.
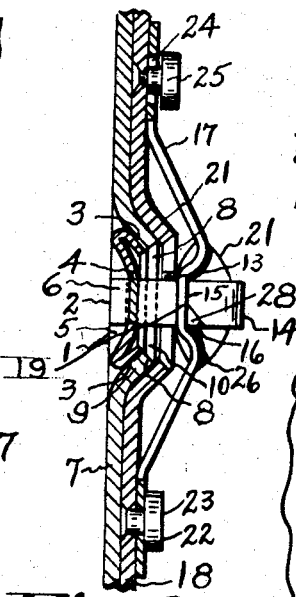
Fig. 3.
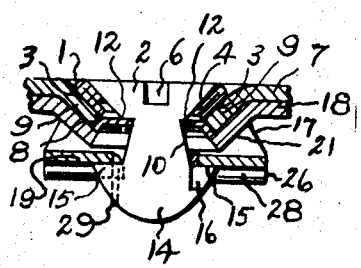
Fig. 4.
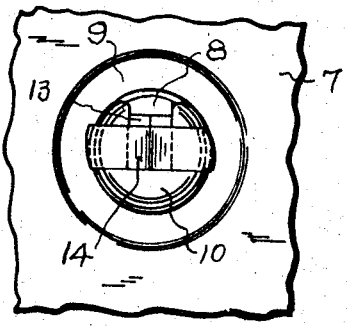
Fig. 5.
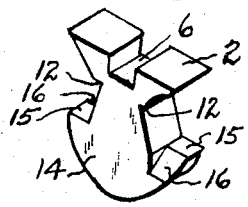
Fig. 6.
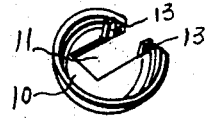
Fig. 7.
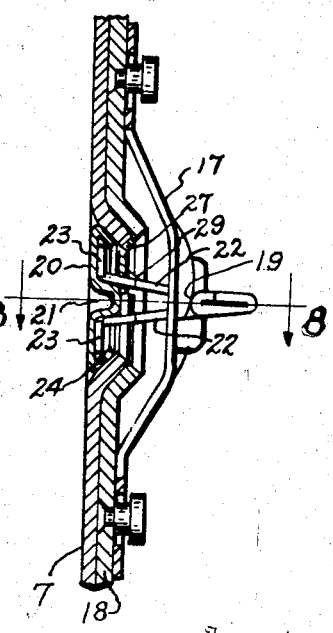
Fig. 8.
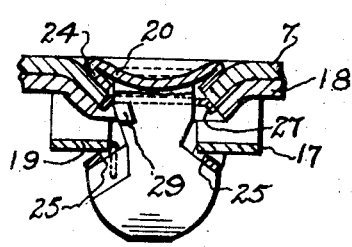
Fig. 9.
Fig. 10.
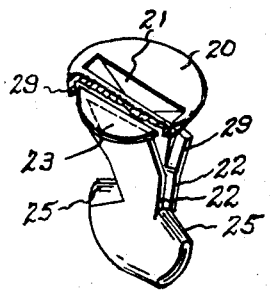
Fig. 11.
Inventor
Walter I. Jones Patented Nov. 16, 1943

2,334,676

UNITED STATES PATENT OFFICE 2,334,676

ROTARY OPERATIVE FASTENER

Walter I. Jones, Belmont, Mass., assignor to United-Carr Fastener Corporation, Cambridge, Mass., a corporation of Massachusetts Original application November 10, 1938, Serial No. 239,826. Divided and this application November 19, 1942, Serial No. 466,153

12 Claims. (Cl. 24—221)

The present invention relates to improvements in rotary operative type fasteners, such as those used for securing cowling sheets of airplanes together and more particularly to the rotary fastener or stud part thereof, and the invention aims generally to improve the construction of such existing fastener parts.

Such rotary operative type fasteners usually consist of a rotary stud part rotatably mounted in one of the parts to be supported, which stud is formed with laterally projecting shoulders or arms which are adapted, upon rotation thereof, to interlock with a fastener socket or spring member attached to a suitable support. Heretofore, such stud parts generally have been screwmachine-made parts, usually fitted with a transverse pin to provide the radial arms thereon, and such parts are relatively slow and expensive to manufacture.

The present application is a division of my prior application Serial No. 239,826, filed November 10, 1938, wherein is claimed certain improvements in the construction and mounting of the spring or socket member of the fastening. The present invention is concerned with the construction of the rotary fastener or stud part irrespective of the type or construction of socket member with which it is used.

Illustrative of the invention, reference is made to the accompanying drawing showing certain preferred embodiments thereof, and wherein:

Fig. 1 is a front elevational view of a portion of an installation of one embodiment of my invention;

Fig. 2 is a longitudinal sectional view as taken on the line 2—2 of Fig. 1;

Fig. 3 is a trasverse sectional view as taken on the line 3—3 of Fig. 1, the shank member of the rotatable stud being shown in elevation;

Fig. 4 is a rear elevation of the rotatable stud assembly;

Fig. 5 is a perspective view of the shank part of the rotatable stud member;

Fig. 6 is a perspective view of the retainer for securing the rotatable stud to its support;

Fig. 7 is a sectional view similar to Fig. 2 illustrating an alternative embodiment of rotatable stud;

Fig. 8 is a transverse sectional view as taken on the line 8—8 of Fig. 7;

Fig. 9 is a rear elevation of the rotatable stud illustrated in Figs. 7 and 8;

Fig. 10 is a perspective view of the rotatable stud illustrated in Figs. 7, 8 and 9, a portion of the head being broken away to illustrate the method of assembly; and Fig. 11 is a perspective view of the attaching washer for assembling the rotatable stud with its support.

Referring to the embodiment of the invention illustrated in Figs. 1 to 6 inclusive, I have shown a rotary stud member for use in a rotary operative type of fastener, such as is adapted to be used in assembling cowling sheets, and the like, of airplanes. Such fasteners, however, are not restricted to such use and in fact may be used in other installations where it is desired to secure together two or more members.

Fasteners of this type are composed primarily of two members, one of which is the rotary member or stud rotatably mounted in one of the members of the installation and which is adapted to cooperate and be interlocked with a spring or socket member mounted on the other member of the installation.

In the embodiment of the invention illustrated in Figs. 1 to 6 inclusive, the rotary member or stud has a head portion 1 and a shank portion 2 made from separate pieces of metal and adapted to be assembled so as to operate as a single unit. The head 1 is preferably in the form of a hollow sheet metal cap having conical-shaped side walls 3 (Figs. 2 and 3). An elongated slot 4 is cut through the front face of the head portion 1 to permit the passage of an end of the shank portion 2 therethrough and the head 1 may be securely attached to the shank 2 by crimping the sides 3 over bevelled faces of the shank to form the conical-shaped side walls 3, as shown in Fig. 3. Depressed portions 5 are formed in the face of the head member 1 at right angles to and on opposite sides of the slot 4, which together with a slot 6 in the end of the shank 2 forms a tool-receiving recess for the reception of a suitable tool by means of which the rotary stud may be turned.

The support for the rotating member of the fastener may be a piece of sheet material 7, for example an airplane cowling sheet, in which is formed an aperture 8 surrounded by a dished or conical-shaped wall 9, providing a bearing surface for the wall 3 of the rotary stud head 1. The conical-shaped walls 9 provide a recess for the conical-shaped head 1 so that the stud may be assembled with its support 7 with the head 1 flush with the outer surface of the support 7, as illustrated in Figs. 2 and 3.

The aperture 8 of the support 7 must be of a size sufficient to permit the passage of the shank 2 therethrough and the stud is held in assembled relation to the apertured support 7 by any suitable means, as for example, by means of a sheet metal washer 10 (Fig. 6) formed with an elongated slot 11 extending inwardly from one edge thereof so that the washer 10 may be slipped edgewise into engagement with a reduced portion of the shank 2 adjacent to the shoulders 12—12, as illustrated in Fig. 3. The washer may be held in place on the shank by means of ears 13 (see Figs. 4 and 6), which are normally upstanding as shown in Fig. 6 but which may be bent downwardly across the slot 11, rearwardly of the shank 2, as shown in Figs. 2 and 4, thus preventing removal therefrom. The washer 10 preferably bears against the end of the conical wall 9 of the plate 7 (Fig. 3), thereby providing a neat assembly of minimum thickness without interference with any other part of the installation.

The shank portion 2 is preferably flat-sided as shown in Figs. 2, 4 and 5, and has a tapered nose portion 14 spaced from the head end 1 and which is passed through the aperture 8 of the plate portion. Adjacent the nose end are socket or spring-engaging portions in the form of lateral projections or shoulders 15—15 having cam surfaces 16 for cooperation with the socket or spring member of the fastening, as will be readily understood.

The socket or spring member 17 may be of any approved form adapted to cooperate and interlock with a rotary stud member having lateral projections, the form shown herein by way of illustration being of the type claimed in my parent application Serial No. 239,826, filed November 10, 1938. Such socket or spring members are suitably attached to a support 18 therefor and comprise at least an apertured seat 19 spaced outwardly from the member 18 and adapted to be engaged, under pressure, by the projecting shoulders of the stud upon rotation of the latter. Advantageously, such socket members may include suitably shaped cam portions adapted to be engaged by the cam surfaces 16 of the stud so as to guide the projecting shoulders of the stud to the seat 19 and subject the supports 7 and 18 to compression.

Referring now to the embodiment of my invention illustrated by Figs. 7 through 11 inclusive, I have shown a fastening means which, except for details of construction, is the same as that described above. Therefore, in connection with this fastener I will limit the description to the difference in details.

The rotating member of this fastener is also made in two pieces, but in this case the head portion 20 has only the tool-receiving recess 21. The shank member is formed from thin sheet metal and is folded at its outer end to provide a pair of leg portions 22—22 (Figs. 7 and 10) with semicircular foot portions 23—23 fitting into the seat at opposite sides of the recess portion 21 and held in assembly by the tapered wall 24. In this manner I have provided a rotating member which in some respects is easier and cheaper to manufacture than the one previously described and its appearance is better since the slot 4 in the part 1 of my first preferred device is eliminated. Another feature of this rotating member is in the diverging shoulders 25—25 formed by curled portions of the metal. These diverging shoulders provide smooth cam surfaces for engagement with the socket member 17 and also, because of their diverging form, provide a very satisfactory take-up means to accommodate variations in thicknesses of the installations.

Another feature of this rotating member is in the attaching washer 27 (Fig. 11) which is formed with an oblong aperture and is adapted to be engaged with the shank by hooking it under one shoulder 25 and then tipping it into place below the shoulder. Assuming, of course, that the rotating member has been placed in the proper position with relation to its support 7, the washer may now be pressed toward the plate where it snaps by yieldable finger portions 29—29 (Figs. 7-8 and 10). These finger portions engage the washer 27 and the washer in turn engages the plate 7 thereby holding the rotating member in assembly with the plate.

The various advantages of the details of my structures could be described more specifically but this is not deemed necessary since anyone skilled in the art will readily appreciate the advantages from an inspection of the drawings and the general description already presented.

While I have illustrated and described preferred embodiments of my invention, I do not wish to be limited thereby because the scope of my invention is best defined by the following claims.

I claim:

1. In a rotary operative type fastener including a socket member as one of the parts thereof, having an apertured stud-receiving portion spaced from the part on which it is mounted; a rotary stud member for cooperation with said socket member and rotatably mounted in a member to be attached to said part, said stud member being of two-piece construction, one of the parts thereof comprising a metal shank having integral laterally projecting shoulders thereon and the other part thereof comprising a sheet metal disc crimped over an end of said shank remote from said shoulders, said shoulders being adapted to engage and interlock with the apertured stud-receiving portion of the socket member on turning movement thereof.

2. In a rotary operative type fastener including a socket member as one of the parts thereof having an apertured stud-receiving portion spaced from the part on which it is mounted; a rotary stud member for cooperation with said socket member and rotatably mounted in a member to be attached to said part, said stud member being of two-piece construction, one of the parts thereof comprising a metal shank having integral laterally projecting shoulders thereon and the other part thereof comprising a sheet metal disc crimped over an end of said shank remote from said shoulders, the outer face of said disc being grooved to form a tool-receiving recess by means of which rotary turning movement may be imparted to said stud.

3. In a rotary operative type fastener including a socket member as one of the parts thereof, having an apertured stud-receiving portion spaced from the part on which it is mounted; a rotary stud member for cooperation with said socket member and rotatably mounted in a member to be attached to said part, said stud member being of two-piece construction, one of the parts comprising an elongated metal shank having a base end and laterally projecting shoulders spaced therefrom, an integral tapered nose disposed outwardly beyond said shoulders, the other part of said stud comprising a sheet metal disc crimped over the base end of said shank, said shoulders being adapted to engage and interlock with the apertured stud-receiving portion of the socket member on turning movement thereof.

4. In a rotary operative type fastener including a socket member as one of the parts thereof, having an aperatured stud-receiving portion spaced from the part on which it is mounted; a rotary stud member for cooperation with said socket member and rotatably mounted in a member to be attached to said part, said stud member being of two piece construction, one of the parts thereof comprising an elongated metal shank having a base end and laterally projecting shoulders spaced therefrom, an integral tapered nose disposed outwardly beyond said shoulders, the other part of said stud comprising a sheet metal disc crimped over the base end of said shank, and a sheet metal washer formed with an elongated opening to receive the shank of said stud for retaining said stud rotatably in its supporting member.

5. In a rotary operative type fastener including a socket member as one of the parts thereof having an apertured stud-receiving portion spaced from the part on which it is mounted; a rotary stud member for cooperation with said socket member and rotatably mounted in a member to be attached to said part, said stud member being of two-piece construction, one of the parts thereof comprising an elongated metal shank having a base end and laterally projecting shoulders spaced therefrom, an integral tapered nose disposed outwardly beyond said shoulders, the other part of said stud comprising a sheet metal disc crimped on the base end of said shank, and a sheet metal washer formed with an elongated opening to receive the shank of said stud, said washer having portions entirely surrounding said shank and serving to retain said stud rotatably in its supporting member.

6. In a rotary operative type fastener including a socket member as one of the parts thereof having an apertured stud-receiving portion spaced from the part on which it is mounted; a rotary stud member for cooperation with said socket members and rotatably mounted in a member to be attached to said part, said stud comprising a head portion disposed on one side of its supporting member and a shank portion extending through and beyond said supporting member and a sheet metal washer formed with an elongated stud extending inwardly from one edge thereof and adapted to be slipped around said shank adjacent the side of the supporting member opposite said head and displaceable portions on said washer adapted to be disposed in said opening behind said shank to prevent accidental removal of said washer from said shank.

7. In a rotary operative fastener installation of the class described a rotary member and a spring member each being associated with separate plate members, said rotary member having a head resting against one side of a plate member and a shank for engagement with the spring extending through an aperture in said plate member and a sheet metal washer-like member formed with a slot open at an edge thereof and capable of being moved laterally into engagement with the rotary member, said washer-like member engaging a face of said plate member opposite said head for securing said rotary member in assembly therewith and means for securing said washer-like member to said rotary member against accidental removal therefrom.

8. In a rotary operative fastener installation of the class described a rotary member and a spring member each being associated with separate plate members, said rotary member having a head resting against one side of a plate member and a shank for engagement with the spring extending through an aperture in said plate member and a sheet metal washer-like member engaging the other side of said plate member and engaging the rotating member to secure it in assembly with said plate member, said washer-like member having a slot therein for the reception of the shank of the rotating member and at least one bendable ear extending into said slot to prevent removal of the washer.

9. In a rotary operative fastener installation of the class described a rotary member and a spring member each being associated with separate plate members, said rotary member having a head resting against one side of a plate member and a shank for engagement with the spring extending through an aperture in said plate member and a sheet metal washer-like member having an oblong aperture therethrough, said shank passing through said oblong aperture and having a yieldable portion snapped through said aperture and engaging said washer-like member to hold it in assembly with said rotary member.

10. In a separable fastener of the class described, a rotating member for fastening engagement with a cooperating spring member, said rotating member including two separate parts comprising a head formed from sheet metal and a shank part also formed from sheet metal, means securing said head to one end of said shank whereby said parts are assembled together to form a single operative unit and said shank having a shoulder in spaced relation to said head.

11. In a separable fastener of the class described, a rotating member for fastening engagement with a cooperating spring member, said rotating member including two separate parts comprising a head part and a shank part, means securing said head to one end of said shank whereby said parts are assembled together to form a single operative unit, said shank member being in the form of a sheet metal strip bent intermediate its ends to have a double thickness and said shank having a shoulder in spaced relation to said head.

12. In a separable fastener of the class described, a rotating member for fastening engagement with a cooperating spring member, said rotating member including two separate parts comprising a circular head part formed from sheet metal and a shank part also formed from sheet metal, means securing said head to one end of said shank whereby said parts are assembled together to form a single operative unit, said shank having a shoulder in spaced relation to said head, and said head having a tool-receiving depression in one face forming a complementary projection on an opposite face, and said projection cooperating with portions of said shank member to prevent relative rotation of the parts.

WALTER I. JONES.